(12) United States Patent
Reed et al.

(10) Patent No.: US 10,432,840 B2
(45) Date of Patent: Oct. 1, 2019

(54) FUSION NIGHT VISION SYSTEM (71) Applicant: L-3 Communications Corporation—Insight Technology Division, Londonderry, NH (US)

(72) Inventors: Matthew Reed, New Boston, NH (US); Joseph W. Robbins, IV, Merrimack, NH (US)

(73) Assignee: L-3 Communication-Insight Technology Division, Londonberry, NH (US)

( * ) Notice: Subject to any disclaimer, the term of this patent is extended or adjusted under 35 U.S.C. 154(b) by 272 days.

(21) Appl. No.: 15/284,709

(22) Filed: Oct. 4, 2016

(65) Prior Publication Data
US 2018/0167541 A1 Jun. 14, 2018

Related U.S. Application Data (60) Provisional application No. 62/238,778, filed on Oct. 8, 2015.

(51) Int. Cl.
| H04N 5/33 | (2006.01) |
| --- | --- |
| H04N 5/225 | (2006.01) |
| G02B 23/18 | (2006.01) |
| G02B 23/12 | (2006.01) |
| H04N 5/232 | (2006.01) |

(52) U.S. Cl.
CPC ........... *H04N 5/2258* (2013.01); *G02B 23/12* (2013.01); *G02B 23/125* (2013.01); *G02B 23/18* (2013.01); *H04N 5/2252* (2013.01); *H04N 5/232939* (2018.08); *H04N 5/332* (2013.01); *H04N 5/33* (2013.01)

(58) Field of Classification Search
USPC .................................. 348/164–168
See application file for complete search history.

(56) References Cited

U.S. PATENT DOCUMENTS

| 6,687,053 | B1 * | 2/2004 | Holmes | G02B 23/18 |
| --- | --- | --- | --- | --- |
| | | | | 2/6.2 |
| 6,798,578 | B1 * | 9/2004 | Beystrum | H04N 5/33 |
| | | | | 345/8 |
| 7,155,781 | B2 * | 1/2007 | Yamada | G06F 1/162 |
| | | | | 16/367 |
| 9,069,530 | B2 * | 6/2015 | Liang | G06F 1/1681 |
| 2006/0143764 | A1 * | 7/2006 | Reed | A42B 3/042 |
| | | | | 2/6.2 |
| 2007/0228259 | A1 * | 10/2007 | Hohenberger | H01J 31/50 |
| | | | | 250/214 LA |
| 2007/0235634 | A1 * | 10/2007 | Ottney | G01J 5/02 |
| | | | | 250/214 VT |
| 2008/0302966 | A1 * | 12/2008 | Reed | G02B 23/12 |
| | | | | 250/330 |
| 2009/0058881 | A1 * | 3/2009 | Ottney | F41G 1/32 |
| | | | | 345/629 |
| 2011/0127392 | A1 * | 6/2011 | Carter | B60R 11/02 |
| | | | | 248/121 |

(Continued)

*Primary Examiner* — Nigar Chowdhury (57) ABSTRACT

A fusion night vision system has a plurality of hinged joints that allow an operator to adjust the distance between the left eye piece and the right eyepiece while allowing a row of pixels from a display to be maintained viewable through the right eye piece parallel with an imaginary line formed by an optical axis of the left eye piece with an optical axis of the right eye piece.

20 Claims, 7 Drawing Sheets

(56) References Cited

U.S. PATENT DOCUMENTS

| | | | |
|---|---|---|---|
| 2014/0302938 A1* | 10/2014 | Lidak | F16D 3/30 |
| | | | 464/125 |
| 2015/0067983 A1* | 3/2015 | Carey | E05D 1/02 |
| | | | 16/225 |
| 2015/0253563 A1* | 9/2015 | DiCarlo | G02B 23/125 |
| | | | 403/322.4 |
| 2016/0180534 A1* | 6/2016 | Emst | G02B 7/12 |
| | | | 348/294 |

* cited by examiner

FUSION NIGHT VISION SYSTEM

CROSS REFERENCE TO RELATED APPLICATIONS

The present application claims the benefit of U.S. provisional patent applications Ser. No. 62/238,778, filed Oct. 8, 2016, the entire disclosure of which are incorporated herein by reference.

TECHNICAL FIELD

The invention is generally related to night vision devices and, more particularly, to systems and methods for improving viewability.

BACKGROUND OF THE INVENTION

Night vision systems include image intensification, thermal imaging, and fusion monoculars, binoculars, and goggles, whether hand-held, weapon mounted, or helmet mounted. Standard night vision systems are typically equipped with one or more image intensifier tubes to allow an operator to see wavelengths of radiation (approximately 400 nm to approximately 900 nm). They work by collecting the tiny amounts of light, including the lower portion of the infrared light spectrum, that are present but may be imperceptible to our eyes, and amplifying it to the point that an operator can easily observe the image. These devices have been used by soldier and law enforcement personnel to see in low light conditions, for example at night or in caves and darkened buildings. These devices take ambient light and magnify the light up to and in excess of 50,000 times and display the image for viewing through an eyepiece. A drawback to night vision goggles is that they cannot see through smoke and heavy sand storms and cannot see a person hidden under camouflage.

Infrared thermal sensors allow an operator to see people and objects because they emit thermal energy. These devices operate by capturing the upper portion of the infrared light spectrum, which is emitted as heat by objects instead of simply reflected as light. Hotter objects, such as warm bodies, emit more of this wavelength than cooler objects like trees or buildings. Since the primary source of infrared radiation is heat or thermal radiation, any object that has a temperature radiates in the infrared. One advantage of infrared sensors is that they are less attenuated by smoke and dust and a drawback is that they typically do not have sufficient resolution and sensitivity to provide acceptable imagery of the scene.

Fusion systems have been developed that combine image intensification with thermal sensing. The image intensification information and the infrared information are fused together to provide a fused image that provides benefits over just image intensification or just thermal sensing. Whereas typical night vision devices with image intensification can only see visible wavelengths of radiation, the fused system provides additional information by providing heat information to the operator.

SUMMARY OF THE INVENTION

According to one aspect of the invention, there is provided a fusion night vision system having a first housing having a first imager for processing information in a first range of wavelengths and a detector for processing information in a second range of wavelengths; a second housing having a second imager for processing information in the first range of wavelengths; and a third housing, the first housing coupled to the third housing through a first coupler, the first coupler having a first hinged joint rotatable about a first axis and a second hinged joint rotatable about a second axis, the first axis spaced a first fixed distance from the second axis.

According to another aspect of the invention, there is provided a vision system having a first housing having a first optical axis, a display, an image combiner; and a first eye piece and a second housing having a second optical axis and a second eye piece, the first housing coupled to the second housing through a first coupler, the first coupler having a first hinged joint rotatable about a first axis and a second hinged joint rotatable about a second axis, the first axis spaced a first fixed distance from the second axis, the first housing and the second housing coupled through the first coupler such that a row of pixels in the display can be maintained viewable through the first eye piece parallel with an imaginary line going through the first optical axis and a second optical axis as the distance between the first optical axis and the second optical axis is varied.

BRIEF DESCRIPTION OF THE DRAWINGS

For a better understanding of the invention, together with other objects, features and advantages, reference should be made to the following detailed description which should be read in conjunction with the following figures wherein like numerals represent like parts.

DETAILED DESCRIPTION

Figure 1A:
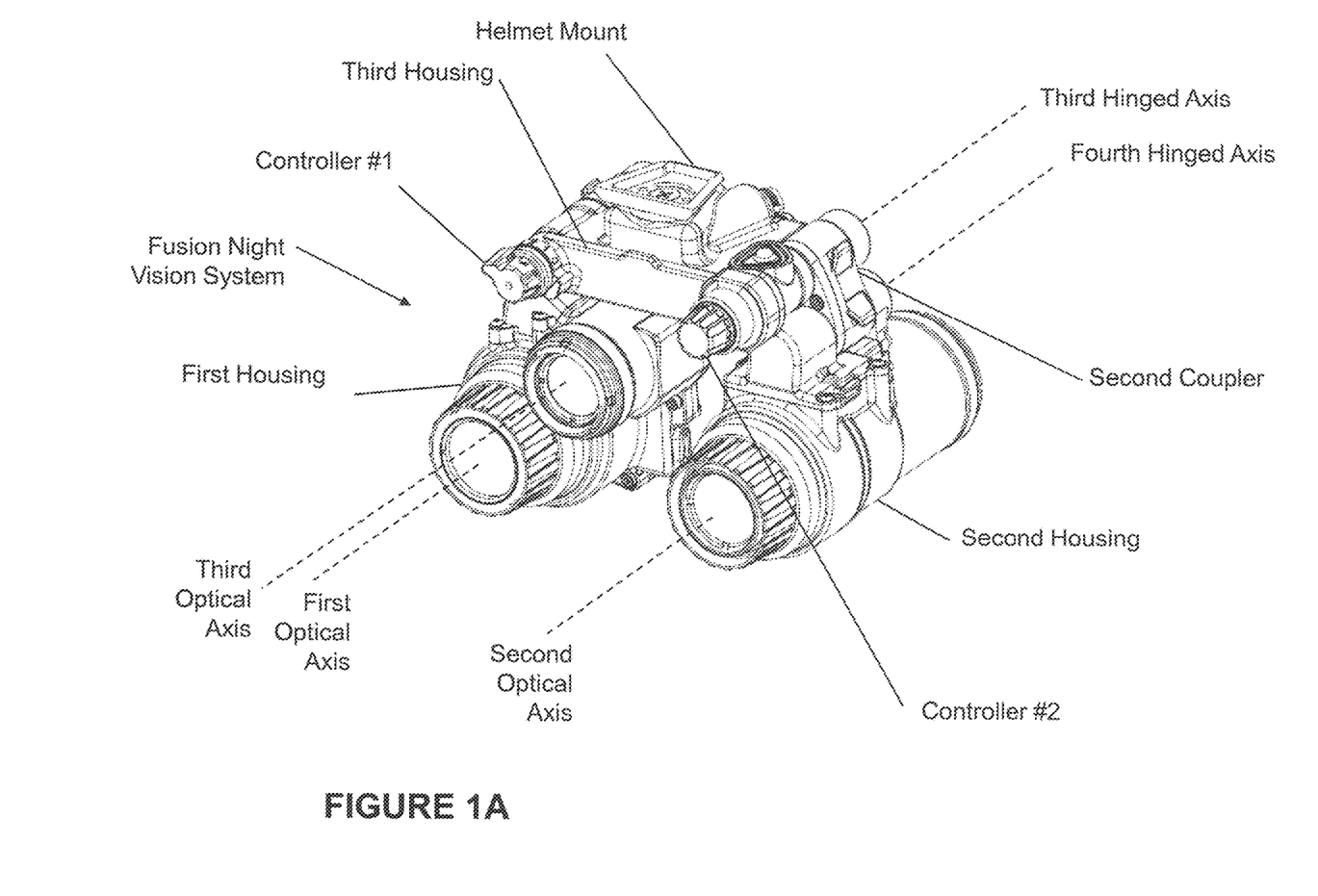
FIG. 1A is a front angled view and FIG. 1B is a rear angled view of a fusion night vision system consistent with the invention.
Figure 1B:
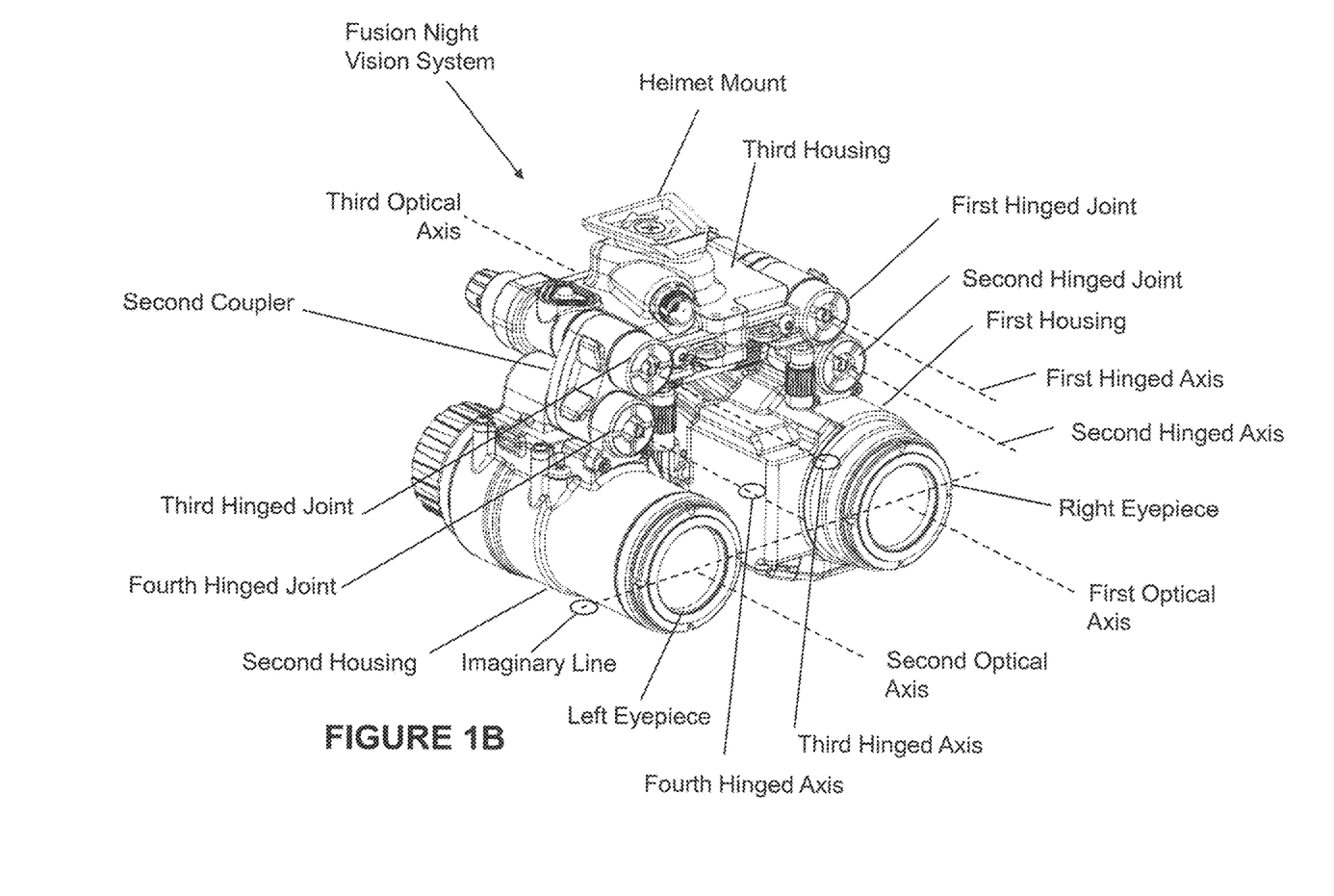
Figure 2:
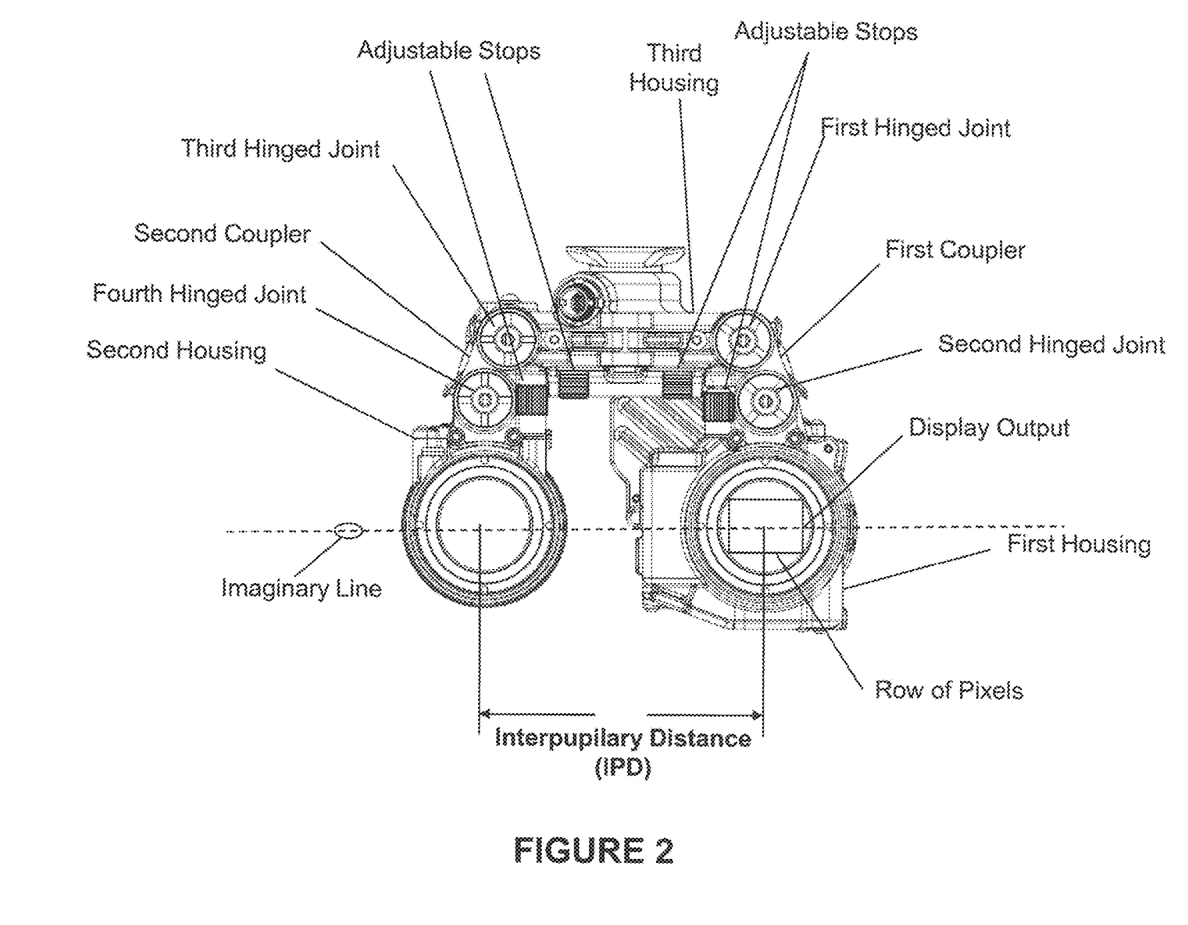
FIG. 2 is rear view of the fusion night vision system of FIG. 1.
Figure 3:
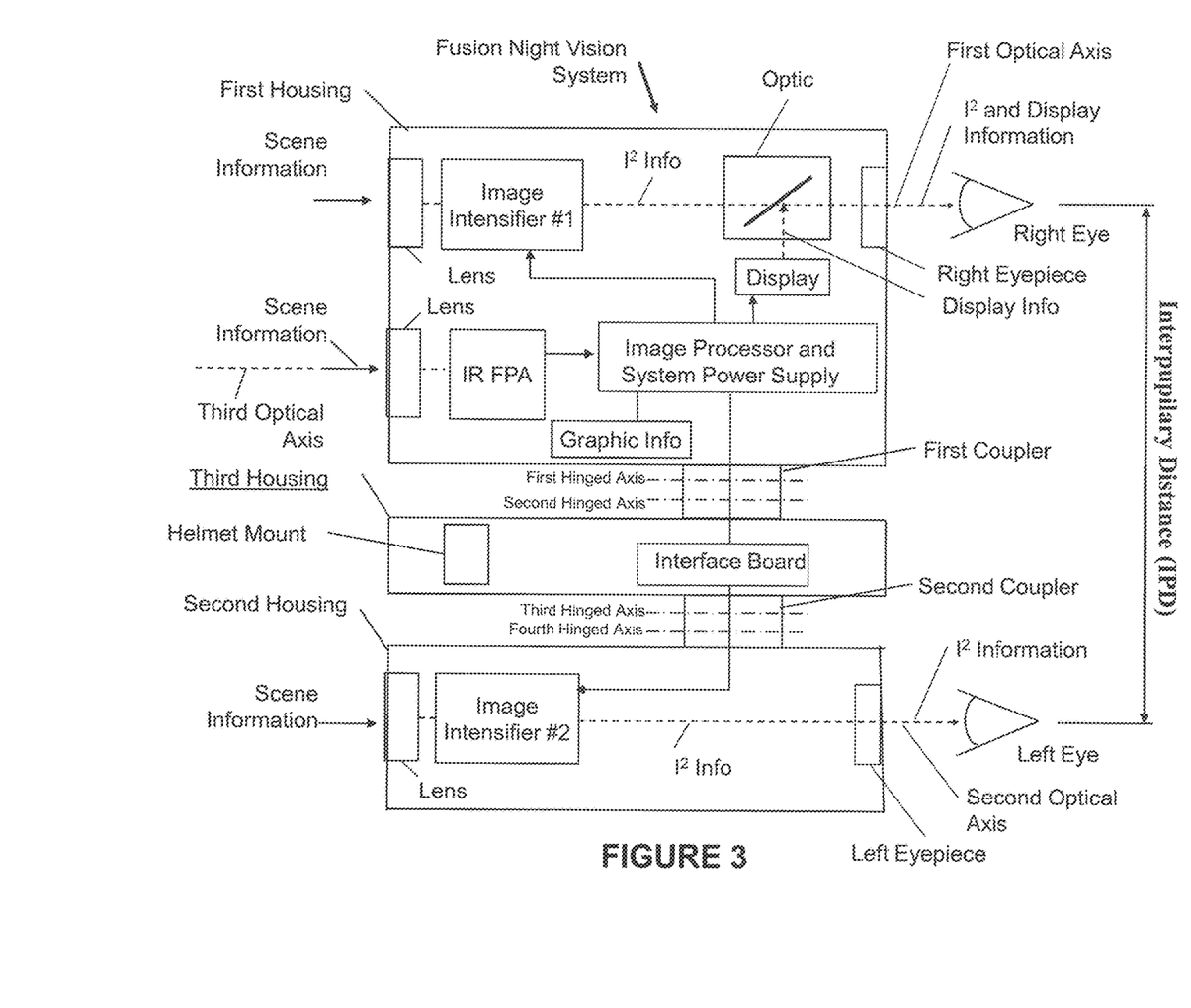
FIG. 3 is a block diagram of the fusion night vision system of FIG. 1.

FIG. 1A is a front angled view, FIG. 1B is a rear angled view, FIG. 2 is a rear view, and FIG. 3 is a block diagram of a fusion night vision system. The fusion night vision system may have a first housing having a first imager for processing information in a first range of wavelengths and a detector for processing information in a second range of wavelengths, a second housing having a second imager for processing information in the first range of wavelengths, and a third housing. The first housing coupled to the third housing through a first coupler, the first coupler having a first hinged joint rotatable about a first axis and a second hinged joint rotatable about a second axis, the first axis spaced a first fixed distance from the second axis.

The first imager and second imagers may be image intensifier tubes for processing information in a first range of wavelengths, for example 450 nm to 1000 nm and the detector may be an Infrared Focal Plane Array (IRFPA) or other SWIR, MWIR, EBAPS, or other detector for processing information in a second range of wavelengths, for example 7,000-14,000 nm. Alternatively, the imagers may be CCD, CMOS, or other imager whose output may be coupled with information from the detector to a display. The first imager having a first optical axis, the second imager having a second optical axis, and the detector having a third optical axis. The first housing may be coupled to the third housing through a first coupler having a first hinged joint rotatable about a first hinged axis and a second hinged joint rotatable about a second hinged axis, the first axis spaced a first fixed distance from the second axis. The second housing may be coupled to the third housing through a second coupler having a third hinged joint rotatable about a third hinged axis and a fourth hinged joint rotatable about a fourth hinged axis, the third hinged axis spaced a second fixed distance from the fourth hinged axis. The first and second housings may each have an appropriate objective lens(es) and respective first and second eye piece. The eye pieces may have one or more ocular lenses for magnifying and/or focusing the image.

The first imager may be positioned in the first housing to direct an enhanced image towards the first eyepiece which may be disposed in front of an operator's eye, for example the operator's right eye. The display in the first housing may be aligned with an optic, for example a corner cube, aligned in front of the first eyepiece for projection of information from the detector into a first optical axis containing enhanced scene information from the first imager. The display may have a series of orthogonal rows and columns of pixels. The image formed by the pixels may be viewable through the right eye piece. The second imager may be positioned in the second housing to direct an enhanced image towards the second eyepiece which may be disposed in front of an operator's eye, for example the operator's left eye. The enhanced scene information may be directed towards the second eye piece along a second optical axis. Display information may be target graphics or icons, incoming video from an overhead UAV, or heading information. The information may be used to augment existing information (augmented reality) from the imagers and may be useful for Remote Target Acquisition (RTA). The hinged joints may have a clutch or friction disk to generate drag.

The third housing may be coupled to the second housing through a second coupler having a third hinged joint having a third hinged axis and a fourth hinged joint having a fourth hinged axis. The first hinged joint may be positionable independently of the second hinged joint and the third hinged joint may be positionable independently of the forth hinged joint. The first hinged joint may be parallel with the second hinged joint and the third hinged joint may be parallel with the fourth hinged joint.

The second housing may be coupled to the third housing such that when the first optical axis is generally parallel with the first and second hinged joints the second optical axis is generally parallel with the third and fourth hinged joints and the third optical axis is generally parallel with the first and second hinged joints. The first housing may be positionable to space the first optical axis an adjustable distance from the second optical axis, this distance being associated with an interpupillary distance. The first housing and the second housing may be positionable through the first and second couplers to accommodate an interpupillary distance from 60-70 mm or even greater, for example from 57-74 mm.

Figures 4A, 4B:
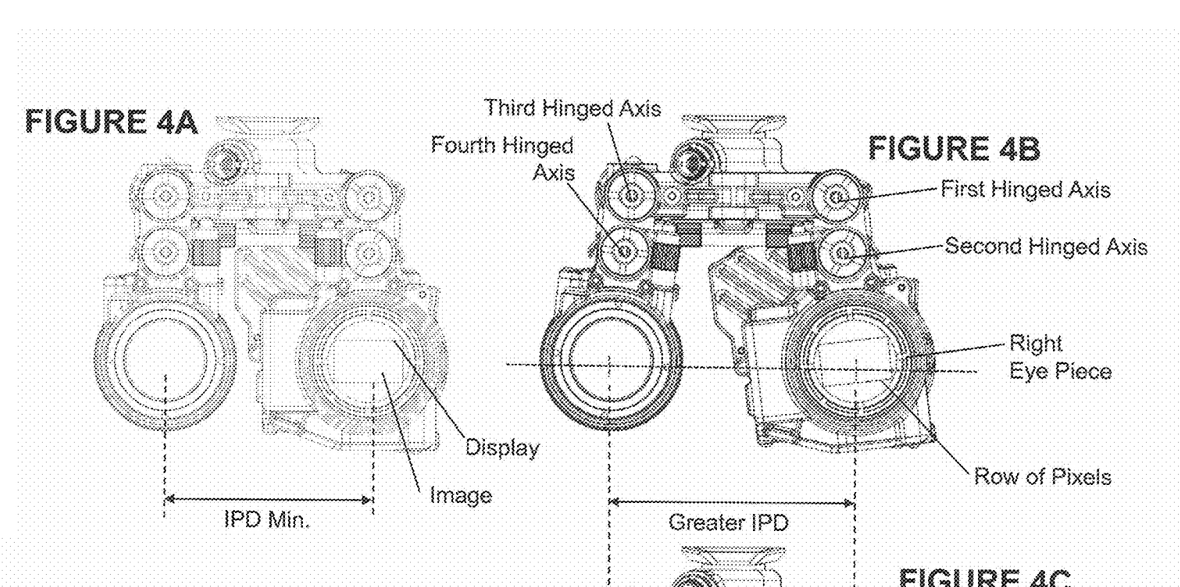
FIG. 4A-4C are rear views of the fusion night vision system as the Interpupillary Distance (IPD) of the system is varied.
Figure 4C:
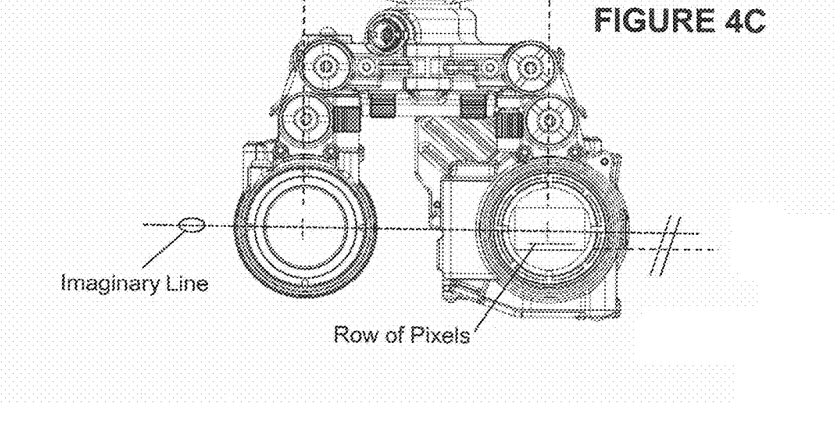

As shown in FIGS. 4A-4D, the first housing and the third housing may be coupled through the first coupler such that a row of pixels in the display can be maintained viewable through the right eye piece parallel with an imaginary line going through the first optical axis and the second optical axis as an operator adjusts the interpupillary distance, that is distance between the first optical axis of the first housing and the second optical axis of the second housing. Without the ability to rotate the first housings relative to the third housing while an operator adjusts the interpupillary distance, the row of pixels would be viewable through the right eye piece at an angle relative to the an imaginary line going through the first optical axis and the second optical axis as shown in FIG. 4B.

There may be a second display in the second housing to allow a fused image to also be projected in the second eyepiece, for example in front of the left eye. If there was a second display in the second housing, the second coupler would likewise provide the ability to align the image from the detector with the image from the second imager in the second housing. In addition, the second coupler may allow the operator to keep the first and second optical axis at the same height for each eye.

Figure 5:
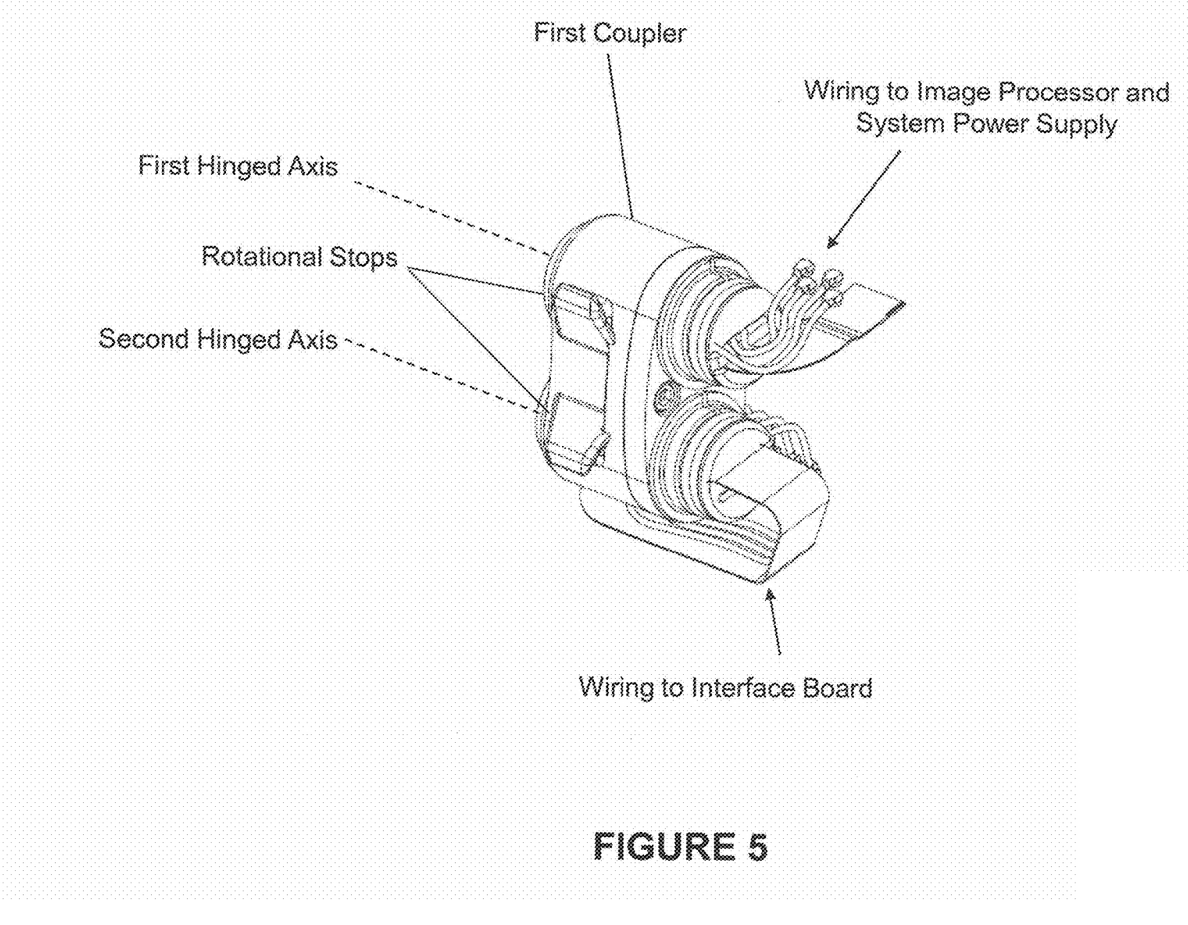
FIG. 5 is a view of a coupler.

The fusion night vision system may have a helmet mount coupled to the third housing that allows it to be mounted to a helmet. The fusion night vision system may be powered by an internal or external battery and may get information to be displayed in the display wirelessly or through a connector. The fusion night vision system may have one or more adjustable stops to allow an operator to set the system up to allow the operator to quickly return the first and second housing to a desired position relative to the third housing appropriate for his/her IPD. The third housing may have an interface board to coordinate signals and power for the other housings. The wires may extend through a channel in each of the couplers (see FIG. 5). The interface board may have a receiver to accept incoming information wirelessly or through a connector. Additional the interface board may have a transmitter to send out information, for example from the detector.

The housings may have a Controller #1 to turn the unit On and Off and another Controller #2 to adjust other parameters, for example the display brightness, auto/manual gain of the thermal channel, and the mix of thermal and image intensification information viewable through the eyepieces.

Since the fusion night vision system has the optical axis of the detector physically offset a distance from the optical axis of the first imager, a menu may be selectable by the operator that allows the operator to select an offset of the image on the display to correct for parallax.

Figure 6:
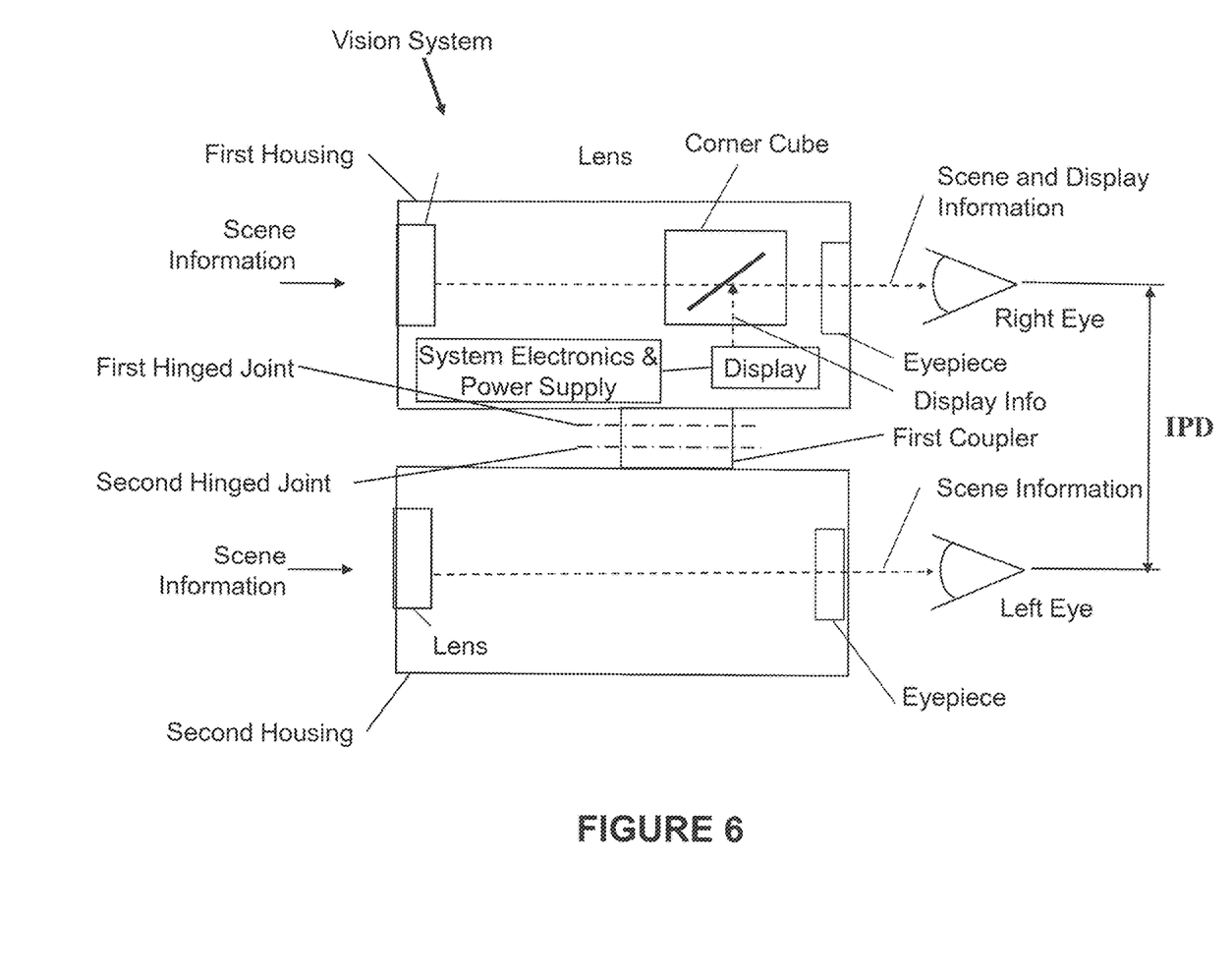
FIG. 6 is a block diagram of a vision system consistent with the invention.

FIG. 6 is a block diagram of a vision system consistent with the invention and may be a pair of "day" binoculars with a display disposed in a first housing. The first housing may be coupled to the second housing through a first coupler having a first hinged joint having a first hinged axis and a second hinged joint having as second hinged axis.

Although several embodiments of the invention have been described in detail herein, the invention is not limited hereto. It will be appreciated by those having ordinary skill in the art that various modifications can be made without materially departing from the novel and advantageous teachings of the invention. Accordingly, the embodiments disclosed herein are by way of example. It is to be understood that the scope of the invention is not to be limited thereby.

What is claimed is:

1. A vision system, comprising:
   a first housing having a first optical axis, a display, an image combiner; and a first eye piece; and
   a second housing having a second optical axis and a second eye piece, the first housing coupled to the second housing through a first coupler, the first coupler having a first hinged joint rotatable about a first axis and a second hinged joint rotatable about a second axis, the first axis spaced a first fixed distance from the second axis, the second housing coupled to the first housing through a second coupler, the second coupler having a third hinged joint rotatable about a third axis, the first housing and the second housing coupled through the first coupler and the second coupler such that a row of pixels in the display when viewed through the first eye piece can be maintained parallel with an imaginary line going through the first optical axis and the second optical axis as the distance between the first optical axis of the first housing and the second optical axis of the second housing is varied.

2. The vision system of claim 1, wherein the first hinged joint is positionable independently of the second hinged joint.

3. The vision system of claim 1, wherein the first hinged joint has a clutch to generate drag.

4. The vision system of claim 1, wherein the first hinged joint has a friction disk to generate drag.

5. The fusion night vision system of claim 1, wherein the first hinged joint is parallel with the second hinged joint.

6. The vision system of claim 1, wherein the second coupler further comprises a fourth hinged joint rotatable about a fourth axis, the fourth axis spaced a second fixed distance from the third axis.

7. The vision system of claim 6, wherein the third hinged joint is positionable independently of the fourth hinged joint.

8. The fusion night vision system of claim 6, wherein the third hinged joint is parallel with the fourth hinged joint.

9. The vision system of claim 1, wherein the third hinged joint has a clutch to generate drag.

10. The vision system of claim 1, wherein the third hinged joint has a friction disk to generate drag.

11. The fusion night vision system of claim 1, wherein the first and second housings are positionable through the first and second couplers to space the first optical axis an adjustable distance from the second optical axis, this distance being associated with an interpupillary distance.

12. The fusion night vision system of claim 11, wherein the interpupillary distance is adjustable from 60-70 mm.

13. The fusion night vision system of claim 11, wherein the interpupillary distance is adjustable from 57-74 mm.

14. A vision system, comprising:
a first housing having a first optical axis, a display, an image combiner; and a first eye piece; and
a second housing having a second optical axis and a second eye piece, the first housing coupled to the second housing through a first coupler, the first coupler having a first hinged joint rotatable about a first axis and a second hinged joint rotatable about a second axis, the first axis spaced a first fixed distance from the second axis, the second housing coupled to the first housing through a second coupler, the second coupler having a third hinged joint rotatable about a third axis, the first housing and the second housing coupled through the first coupler and the second coupler such that a row of pixels in the display when viewed through the first eye piece can be maintained in a position relative to an imaginary line going through the first optical axis and the second optical axis as the distance between the first optical axis of the first housing and the second optical axis of the second housing is varied.

15. The vision system of claim 14, wherein the position is parallel to the imaginary line.

16. The vision system of claim 14, wherein the second coupler further comprises a fourth hinged joint rotatable about a fourth axis, the fourth axis spaced a second fixed distance from the third axis.

17. The vision system of claim 16, wherein the first hinged joint is positionable independently of the second hinged joint and the third hinged joint is positionable independently from the fourth hinged joint.

18. The fusion night vision system of claim 14, wherein the first and second housings are positionable through the first and second couplers to space the first optical axis an adjustable distance from the second optical axis, this distance being associated with an interpupillary distance.

19. The fusion night vision system of claim 18, wherein the interpupillary distance is adjustable from 60-70 mm.

20. The fusion night vision system of claim 18, wherein the interpupillary distance is adjustable from 57-74 mm.

* * * * *